(12) United States Patent
Sugimoto et al.

(10) Patent No.: US 10,961,948 B2
(45) Date of Patent: Mar. 30, 2021

(54) ENGINE DEVICE

(71) Applicant: Yanmar Co., Ltd., Osaka (JP)

(72) Inventors: Masato Sugimoto, Osaka (JP); Kota Takamatsu, Osaka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 0 days.

(21) Appl. No.: 16/498,927

(22) PCT Filed: Jan. 29, 2018

(86) PCT No.: PCT/JP2018/002709
§ 371 (c)(1),
(2) Date: Sep. 27, 2019

(87) PCT Pub. No.: WO2018/179776
PCT Pub. Date: Oct. 4, 2018

(65) Prior Publication Data
US 2020/0049100 A1 Feb. 13, 2020

(30) Foreign Application Priority Data
Mar. 29, 2017 (JP) .............................. JP2017-066462

(51) Int. Cl.
*F02M 25/00* (2006.01)
*F02M 35/10* (2006.01)
(Continued)

(52) U.S. Cl.
CPC ........... *F02F 1/24* (2013.01); *F02M 21/0278* (2013.01); *F02M 35/112* (2013.01);
(Continued)

(58) Field of Classification Search
CPC .. F02M 21/0278; F02M 25/00; F02M 35/104; F02M 69/045
See application file for complete search history.

(56) References Cited

U.S. PATENT DOCUMENTS 4,779,594 A * 10/1988 Oda ...................... F02M 69/04
123/432
5,012,770 A * 5/1991 Okamoto ......... F02M 35/10032
123/184.42
(Continued)

FOREIGN PATENT DOCUMENTS

JP    H9-228898 A    9/1997
JP    2001-107808 A    4/2001
(Continued)

OTHER PUBLICATIONS

International Search Report dated Mar. 20, 2018 issued in corresponding PCT Application PCT/JP2018/002709 cites the patent documents above.

*Primary Examiner* — Long T Tran
(74) *Attorney, Agent, or Firm* — Norton Rose Fulbright US LLP

(57) ABSTRACT

An engine device having gas injectors attached to an intake manifold fixed to a side surface of a cylinder head. A fuel gas injected from the gas injectors is premixed in the intake manifold, and the resulting gas is supplied to a plurality of cylinders and ignited by ignition devices. The intake manifold has a configuration in which a plurality of intake branch pipes communicating with the cylinders are branched from an intake collecting pipe at an air supply side. The intake branch pipes include bent portions. In the bent portions of the intake branch pipes, inside inner walls near the cylinder head are bent at an acute angle.

20 Claims, 16 Drawing Sheets

(51) Int. Cl.
  *F02F 1/24* (2006.01)
  *F02M 21/02* (2006.01)
  F02M 35/112 (2006.01)
  F02M 37/00 (2006.01)
  F02M 61/04 (2006.01)
  F02M 61/14 (2006.01)
  F02M 69/04 (2006.01)

(52) U.S. Cl.
  CPC ......... *F02M 37/0011* (2013.01); *F02M 61/04* (2013.01); *F02M 61/14* (2013.01); *F02M 69/045* (2013.01)

(56) References Cited

U.S. PATENT DOCUMENTS

| | | | | |
|---|---|---|---|---|
| 5,992,388 | A | 11/1999 | Seger | |
| 6,192,865 | B1* | 2/2001 | Hori | F02F 1/38 123/470 |
| 6,269,797 | B1* | 8/2001 | Uchida | F02F 1/108 123/468 |
| 6,814,032 | B2* | 11/2004 | Goto | F02D 19/105 123/27 GE |
| 2003/0089327 | A1* | 5/2003 | Ochiai | F02M 35/167 123/184.21 |
| 2004/0065293 | A1* | 4/2004 | Goto | F02B 19/108 123/275 |
| 2005/0109321 | A1* | 5/2005 | Ikeda | F02M 35/162 123/432 |
| 2006/0288980 | A1* | 12/2006 | Hara | F02B 23/104 123/308 |
| 2010/0251993 | A1 | 10/2010 | Sugiyama | |
| 2013/0174814 | A1* | 7/2013 | Sugiyama | F02M 21/0248 123/525 |
| 2013/0263797 | A1* | 10/2013 | Sugiura | F02B 29/0462 123/41.01 |
| 2014/0305408 | A1* | 10/2014 | Bleyer | F02F 1/243 123/445 |
| 2016/0258396 | A1 | 9/2016 | Nishimura et al. | |

FOREIGN PATENT DOCUMENTS

| | | |
|---|---|---|
| JP | 2006-105065 A | 4/2006 |
| JP | 2010-242559 A | 10/2010 |
| JP | 2011-102547 A | 5/2011 |
| JP | 2012-188937 A | 10/2012 |
| JP | 2015-086728 A | 5/2015 |
| WO | 2015/080082 A | 6/2015 |

* cited by examiner

ENGINE DEVICE

CROSS REFERENCES TO RELATED APPLICATIONS

This application is a national stage application pursuant to 35 U.S.C. § 371 of International Application No. PCT/JP2018/002709, filed on Jan. 29, 2918 which claims priority under 35 U.S.C. § 119 to Japanese Patent Application No. 2017-066462 filed on Mar. 29, 2017, the disclosures of which are hereby incorporated by reference in their entireties.

TECHNICAL FIELD

The present invention relates to an engine device to be mounted on various vehicles and containers for freight transportation, and more particularly to an engine device in which an output shaft is rotated based on combustion using a fuel gas.

BACKGROUND ART

There has been provided a gas engine that is driven by igniting an air-fuel mixture of a fuel gas and air by an ignition device (ignition plug) (see, for example, Patent Literature 1: PTL 1). In a gas engine described in PTL 1, an injector is fixed to an intake manifold, a fuel gas injected from the injector is mixed with air in an intake manifold, and the mixture is supplied to an intake port of a cylinder head. As an engine device in which a premixed gas is ignited by an ignition device, a gasoline engine using gasoline as fuel has also been proposed to date (see Patent Literature 2: PTL 2).

CITATION LIST

Patent Literature

PTL 1: Japanese Patent Application Laid-Open No. 2001-107808
PTL 2: Japanese Patent Application Laid-Open No. 2012-188937

SUMMARY OF INVENTION

Technical Problem

In the gasoline engine described in PTL 2, since gasoline sprayed to the air is a liquid fuel, air can intervene in splayed gasoline, and the sprayed fuel is easily diffused to the air. On the other hand, in a gas engine as described in PTL 1, since a fuel gas sprayed to the air is a gaseous fuel, the fuel gas forms a band-like gas layer in the air. Thus, air does not easily intervene in the fuel gas, and diffusibility of a fuel gas in the air degrades. In particular, in a case where an injector is attached to an intake manifold in an arrangement as described in PTL 2 in a gas engine, a fuel gas is sprayed along an air flow in the intake manifold, and thus, an air-fuel mixture is poorly mixed so that emission might be degraded.

Solution to Problem

A technical issue of some aspects of the present invention is to provide an engine device improved based on studies on the existing circumstances as mentioned above.

An aspect of the present invention provides an engine device including: a cylinder head; an intake manifold fixed to a side surface of the cylinder head; and a gas injector attached to the intake manifold, the engine device being configured such that a fuel gas injected from the gas injector is premixed in the intake manifold, supplied into a plurality of cylinders, and ignited by an ignition device, the intake manifold has a configuration in which a plurality of intake branch pipes communicating with the cylinder are branched from an intake collecting pipe at an air supply side, each of the intake branch pipes having a bent portion, and in the bent portion of each of the intake branch pipes, an inside inner wall near the cylinder head is bent at an acute angle.

In the engine device, the cylinder head may be fixed to an upper surface of a cylinder block, and in the intake manifold, the intake collecting pipe may be disposed at a side of the cylinder block, the intake branch pipes may extend upward from the intake collecting pipe, and may have the bent portions at a side of the cylinder head, and a gas injecting port of the gas injector is inserted in the bent portion.

In the engine device, in the intake manifold, a gas injection direction in which a fuel gas is injected from a gas injecting port of the gas injector may be a direction toward a location on an upper surface of an inside inner wall of the bent portion, the location being closer to the cylinder head than a bent point.

In the engine device, in the intake manifold, a projection projecting toward the inside inner wall may be disposed on an outside inner wall of the bent portion at a location closer to the cylinder head than the gas injecting port.

In the engine device, a gasoline injector may be disposed on the cylinder head, a fuel injection port of the gasoline injector may be inserted to an intake port in the cylinder head, and a portion of the cylinder head in which the fuel injection port is inserted may project inward of the intake port.

In the engine device, the intake manifold may be formed by aluminium die casting.

In the engine device, in the intake manifold, the plurality of the intake branch pipes may be arranged in a front-rear direction, and an intake air taking portion protruding in a direction opposite to a direction toward the cylinder head may be provided at a center of the intake collecting pipe in the front-rear direction.

In the engine device, the intake manifold may include a pair of front and rear coupling seats near a foremost one and a rearmost one of the intake branch pipes extending from front and rear ends of the intake collecting pipe, and a fuel gas supply rail for supplying a fuel gas to the plurality of gas injectors may be fixed to the pair of front and rear coupling seats to thereby extend in the front-rear direction above the intake manifold.

Advantageous Effects of Invention

In an aspect of the present invention, while air that has flowed from the intake collecting pipe into the intake branch pipes flows along each of the inside inner wall and the outside inner wall, an air flow is suddenly bent on the inside inner wall where an air flow is at an acute angle, and thus, separation occurs in a downstream side on the inside inner wall. Accordingly, air vortexes occur in the bent portions of the intake branch pipes, and a fuel gas is mixed in air by the influence of turbulent flows caused by the air vortexes, and mixing of a fuel gas in air is promoted. Thus, degradation of emission can be suppressed.

In an aspect of the present invention, a fuel gas is injected toward vortex flows of air generated in the bent portions in the intake manifold from the gas injecting ports of the gas injectors, and the fuel gas is easily mixed in air. Thus, in an air-fuel mixture to be supplied to the intake port of the cylinder head, nonuniformily in a fuel gas concentration decreases. As a result, abnormal combustion in the cylinders can be suppressed.

In an aspect of the present invention, an attachment angle of the gas injectors is disposed downstream of (closer to the cylinder head than) the bent point (corner), and a fuel gas is injected from the gas injectors toward turbulent flows formed downstream of the upper surface portion of the inside inner wall. Thus, mixing of an air-fuel mixture can be enhanced.

In an aspect of the present invention, air flowing in the intake air channel of the intake branch pipes is subjected to separation by the inside inner walls and the projections at a downstream side of the gas injecting ports of the gas injectors, and vortex turbulent flows are generated on upper surface portions of the inside inner wall and downstream of the projections. Thus, gaseous fuel from the gas injectors is injected toward air turbulent flows generated in the bent portions of the intake branch pipes, and thus, the gaseous fuel and air are efficiently mixed. Consequently, emission can be reduced.

DESCRIPTION OF EMBODIMENTS

First Embodiment

Figure 1:
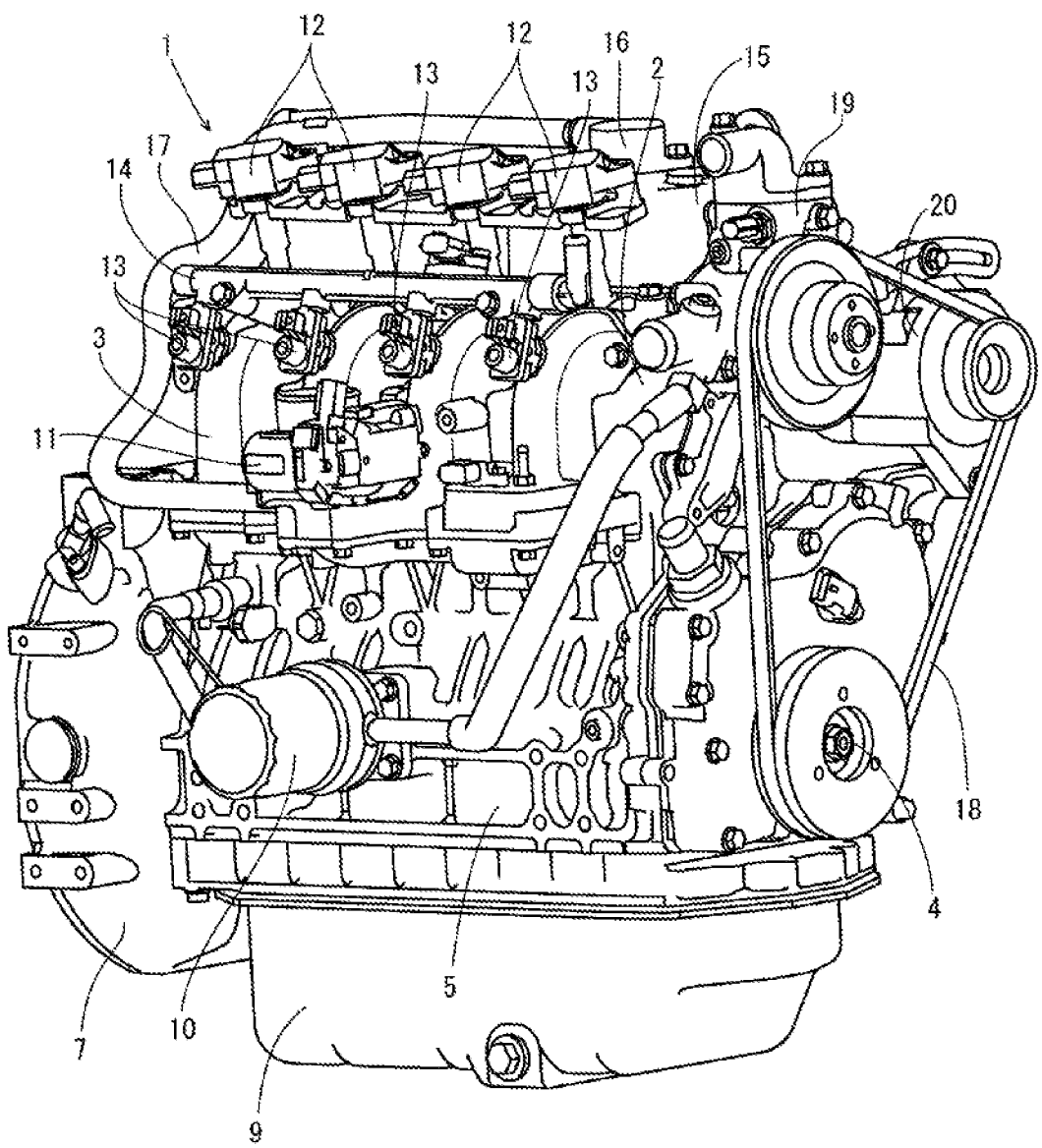
FIG. 1 A perspective view of a gas engine according to a first embodiment of the present invention when seen from left rear.

In the following, a gas engine 1 according to a first embodiment of the present invention will be described with reference to the drawings. In the following description, when the terms indicating specific directions and positions (e.g., "left and right" and "top and bottom") are used as necessary, a side of the gas engine 1 toward an intake manifold 3 is described as a left side of the gas engine 1, a side of the gas engine 1 toward an exhaust manifold 6 is described as a right side of the gas engine 1, a side toward a flywheel housing 7 is described as a front side of the gas engine 1, and a side toward a transmission belt 18 is described as a rear side of the gas engine 1. These terms are used for convenience of explanation, and are not intended to limit the technical scope of the invention.

Figure 2:
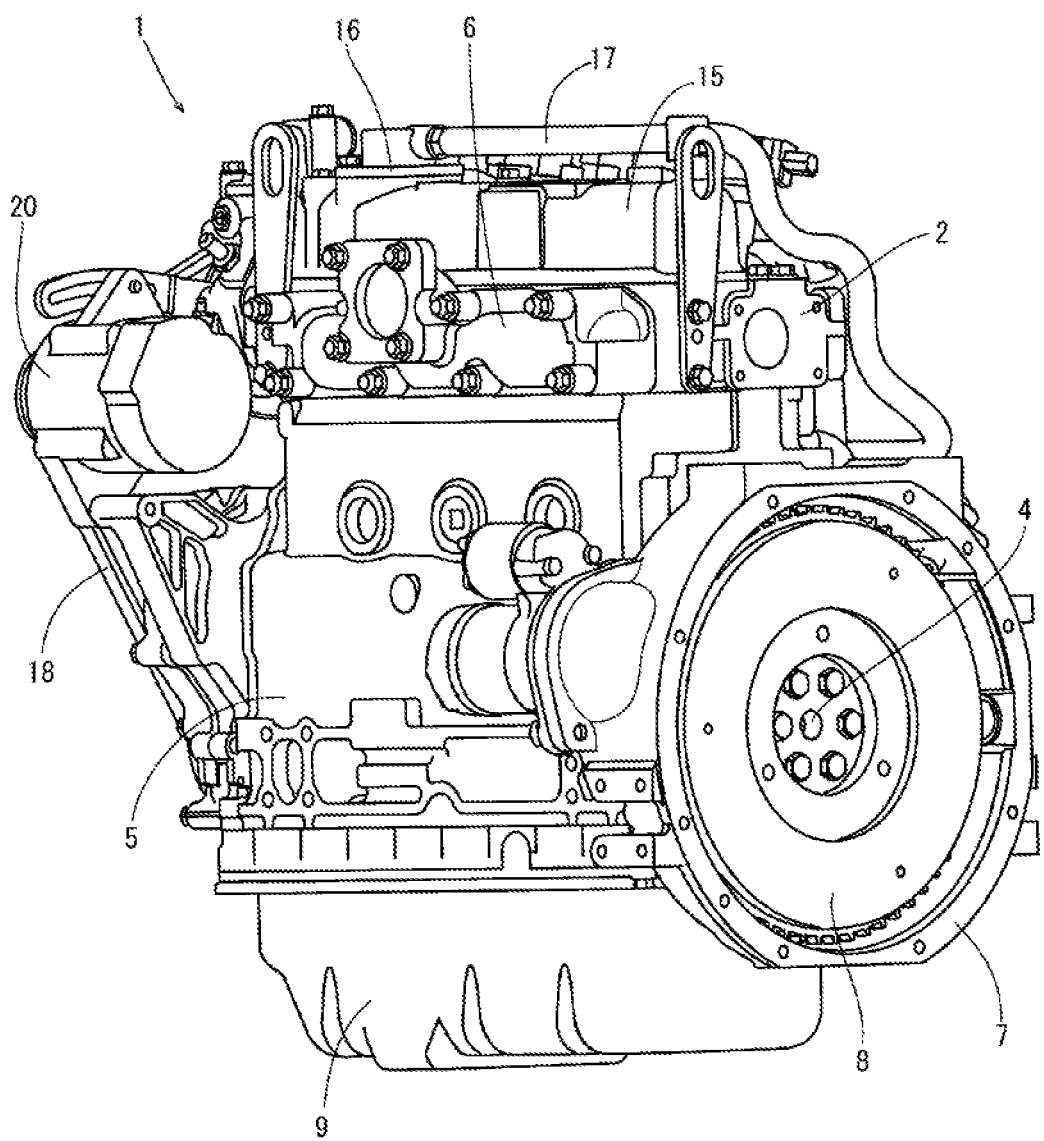
FIG. 2 A perspective view of the gas engine when seen from right front.
Figure 3:
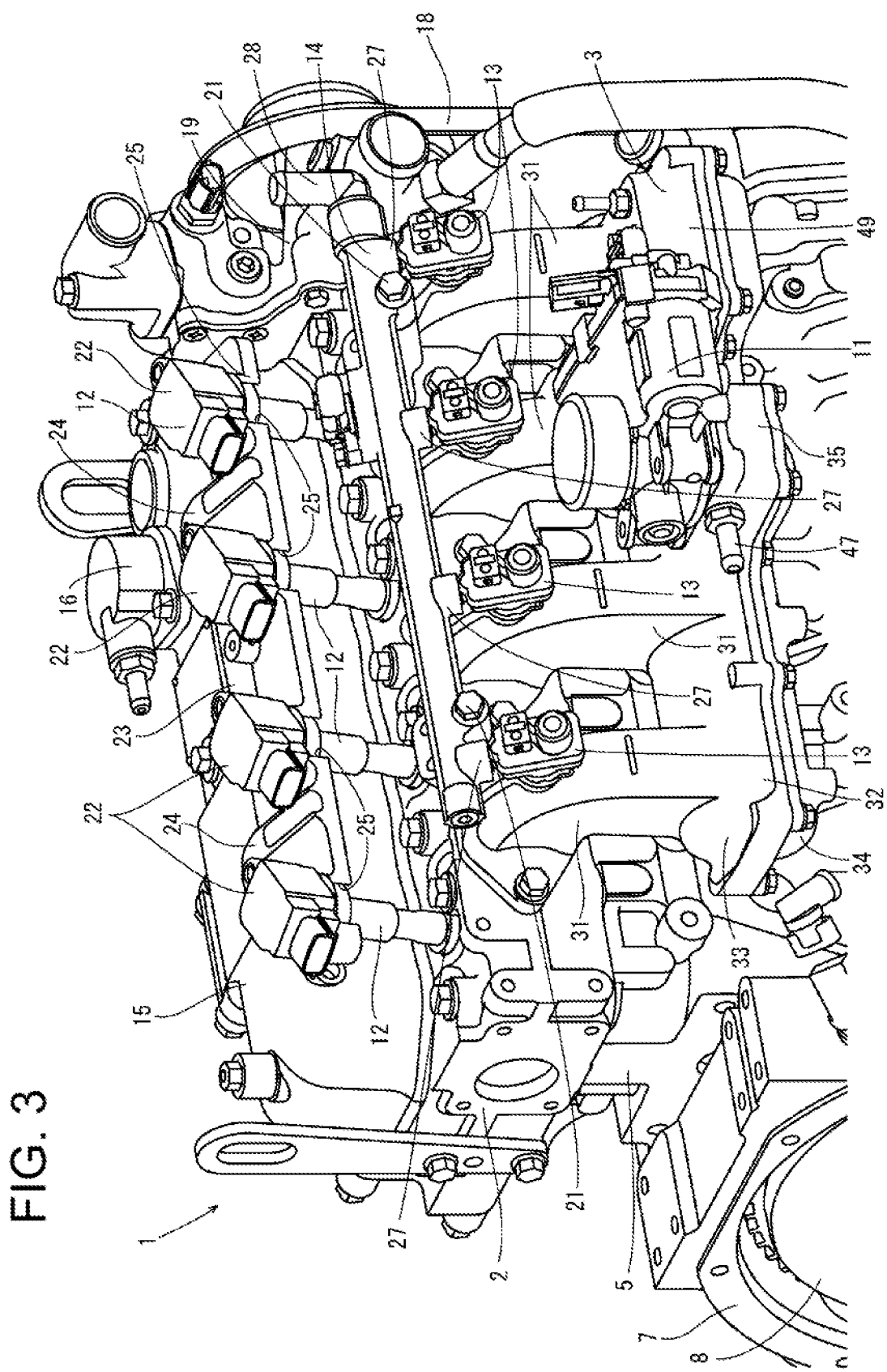
FIG. 3 An enlarged perspective view of the gas engine.
Figure 4:
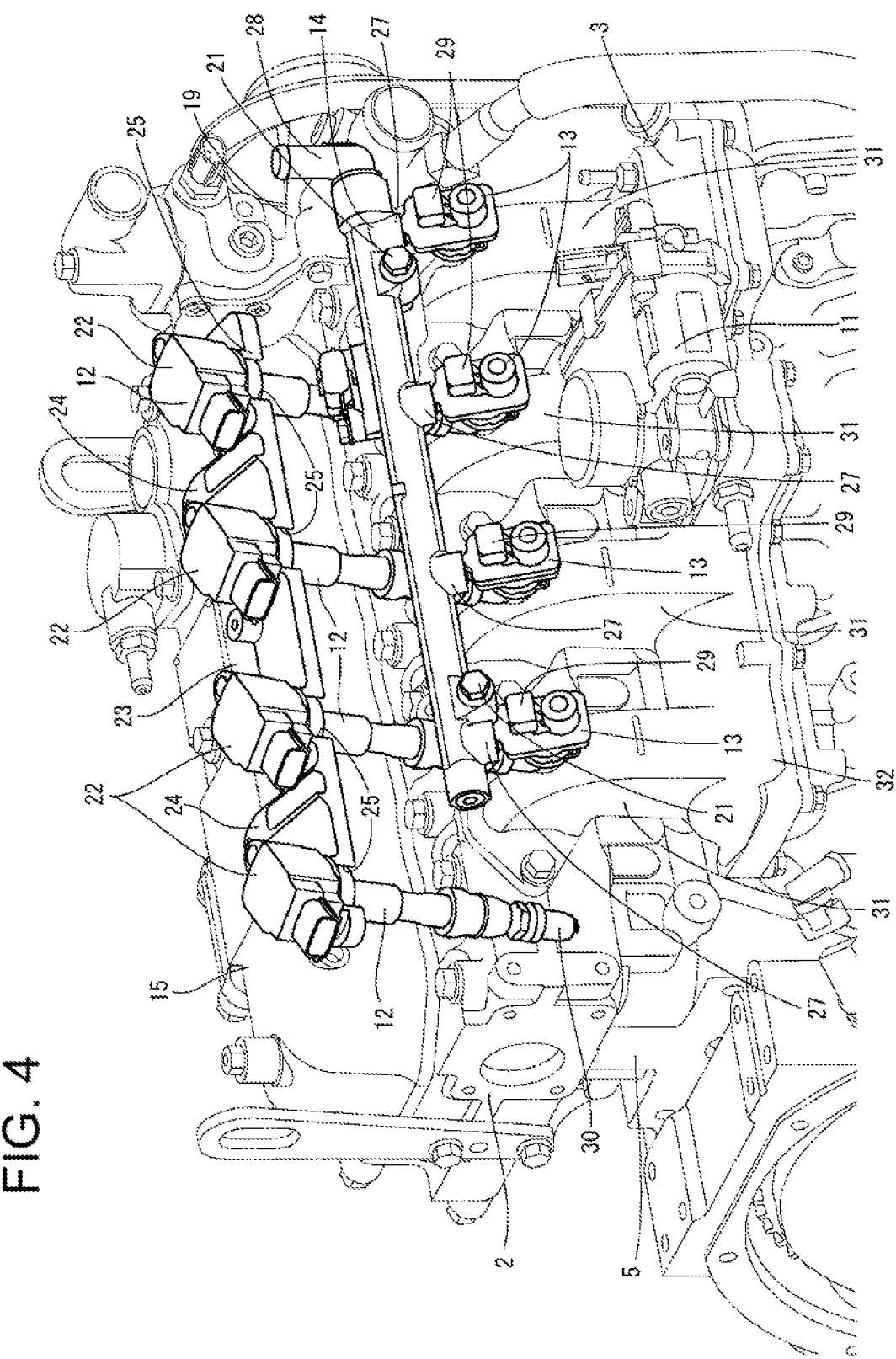
FIG. 4 A perspective view illustrating a relationship between an ignition device and a gas injector of the gas engine.
Figure 5:
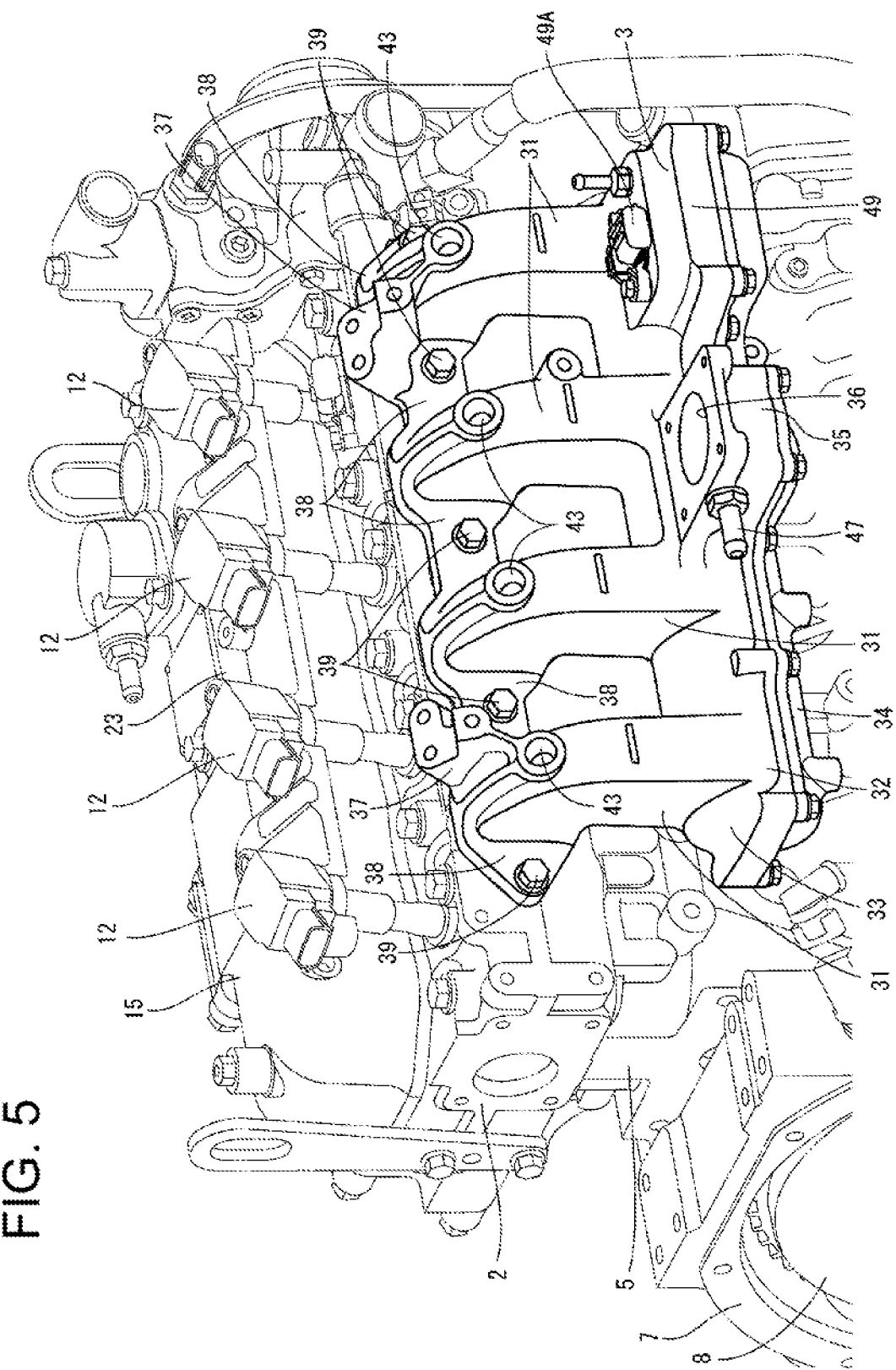
FIG. 5 A perspective view of an intake manifold of the gas engine.
Figure 6:
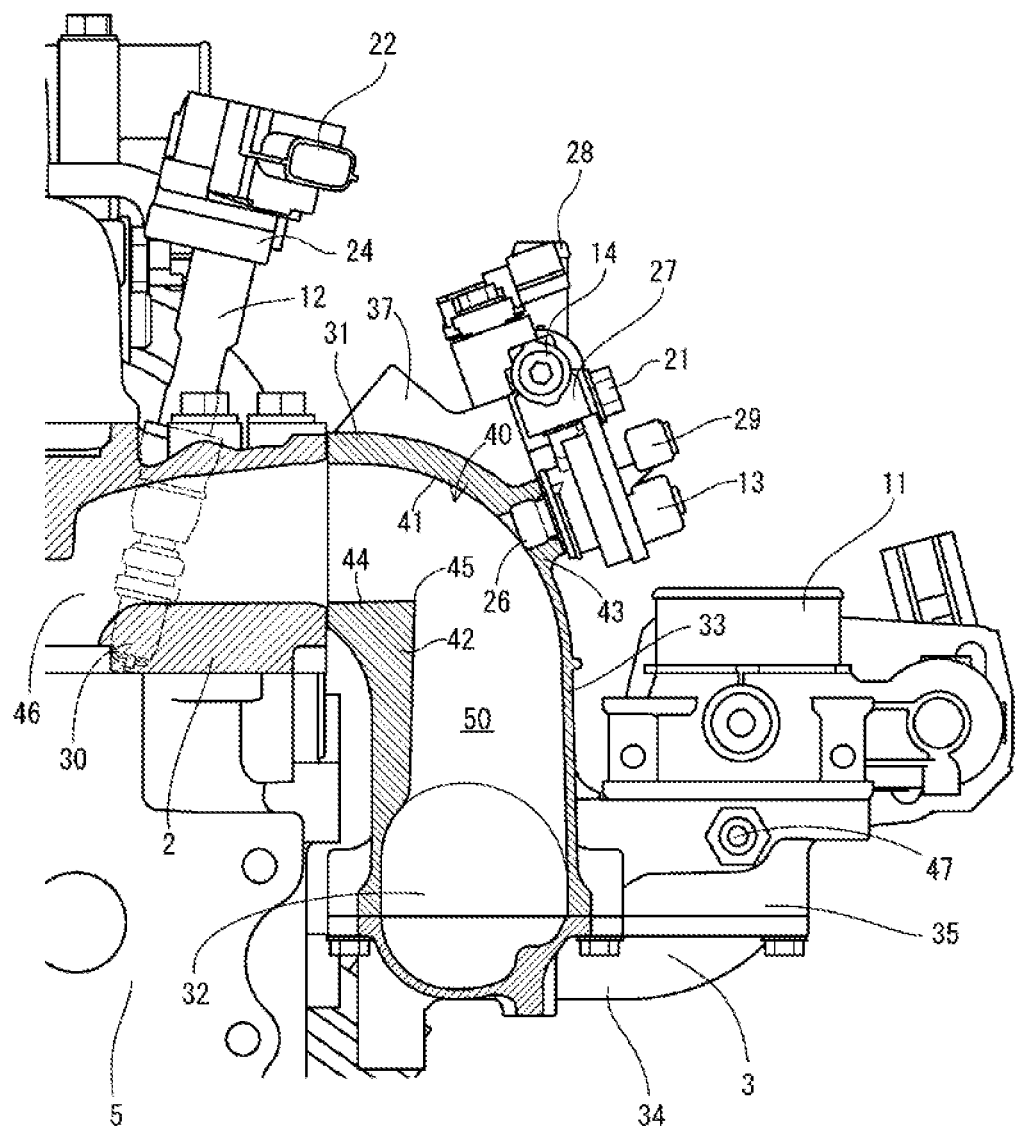
FIG. 6 A cross-sectional view of the intake manifold and a cylinder head of the gas engine.
Figure 7:
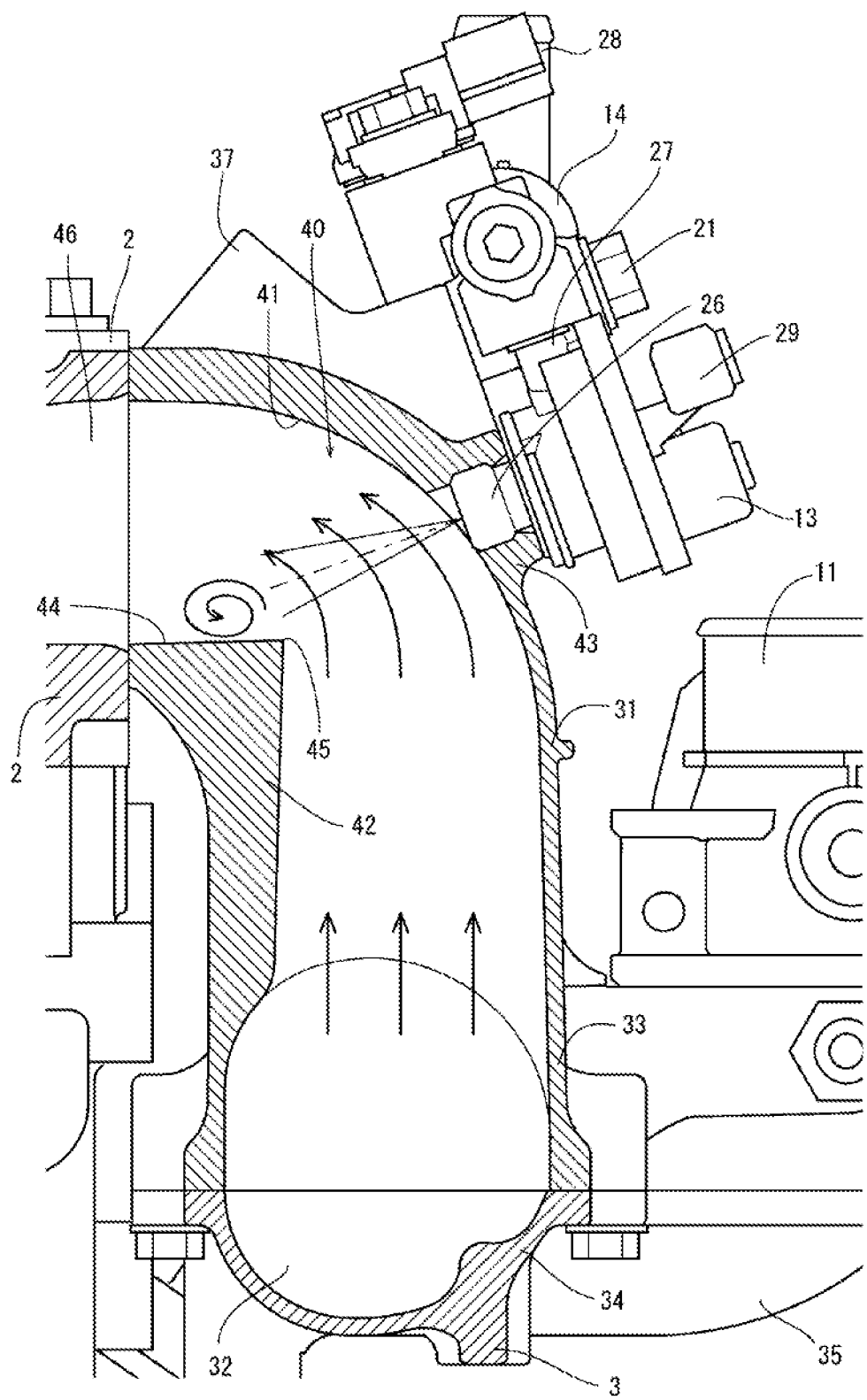
FIG. 7 An enlarged cross-sectional view of FIG. 6.
Figure 8:
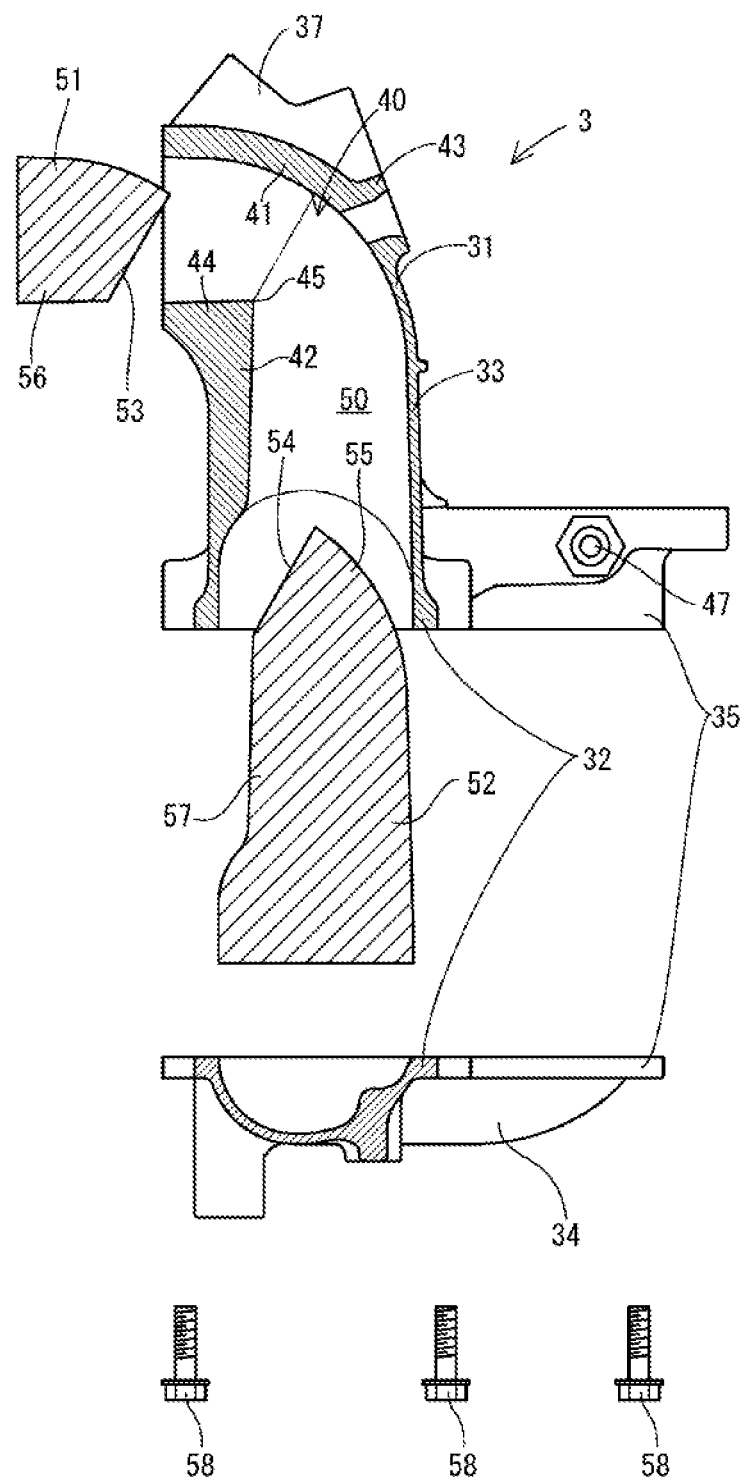
FIG. 8 A disassembled cross-sectional view illustrating a configuration of the intake manifold of the gas engine.

The gas engine 1 according to this embodiment is configured to be driven by a premixed combustion system in which a fuel gas such as a natural gas is mixed with air and subjected to combustion. As illustrating FIGS. 1 through 3, the intake manifold 3 is disposed on a left side surface of a cylinder head 2 located in an upper portion of the gas engine 1. The cylinder head 2 is mounted on a cylinder block 5 incorporating an engine output shaft 4 (crankshaft) and a plurality of cylinders (not shown). The exhaust manifold 6 is disposed on a right side surface of the cylinder head 2. Front and rear distal ends of the engine output shaft 4 protrude from the front and rear side surfaces of the cylinder block 5.

The gas engine 1 has a configuration in which a plurality of cylinders are arranged in series in the cylinder block 5. Each cylinder in the cylinder block 5 communicates with the intake manifold 3 disposed at a left side surface of the cylinder head 2. Although not specifically shown, an air cleaner that purifies outdoor air with removal of dust and takes the resulting air through an intake air throttle valve 11 is connected to the intake manifold 3. Ignition devices 12 individually associated with the cylinders and configured to ignite premixed gas in the cylinders are disposed on a left portion (near the intake manifold 3) of the upper surface of the cylinder head 2. Each of the ignition devices 12 generates spark discharge by high voltage in the cylinder to cause combustion of the premixed gas in the cylinder. The combustion of the premixed gas causes a piston in the cylinder to reciprocate so that the engine output shaft 4 is driven to rotate, and power of the gas engine 1 is generated.

The intake manifold 3 fixed to the left side surface of the cylinder head 2 includes intake branch pipes 31 in the same number as the cylinders, and gas injectors 13 are inserted in the intake branch pipes 31. The gas injectors 13 in the same number as the cylinders are coupled to a fuel gas supply rail 14 extending in the front-rear directions (in parallel with the engine output shaft 4) above the intake manifold 3. The fuel gas supply rail 14 is fixed and fastened to the intake manifold 3 with bolts 21.

The fuel gas supply rail 14 is connected to a gas cylinder 100 (see FIGS. 17 and 18) described later through a vaporizer (carburetor). The gas cylinder 100 stores a liquid fuel gas, and after the fuel gas in the gas cylinder 100 is vaporized by the vaporizer, the resulting gas is supplied to the gas injectors 13 through the fuel gas supply rail 14. The gas injectors 13 injects the fuel gas into the intake branch pipes 31 so that fresh air and a fuel gas in the intake manifold 3 are mixed and stirred in the intake branch pipes 31 and are supplied to intake ports of the cylinders in the cylinder block 5. The cylinders in the cylinder block 5 communicate with not only the intake manifold 3 but also the exhaust manifold 6 fixed to the right side surface of the cylinder head 2, and an exhaust gas is exhausted to the exhaust manifold 6 through exhaust ports in the cylinders.

Next, with reference to FIGS. 3 through 6, the ignition devices 12, the gas injectors 13, and the fuel gas supply rail 14 will be specifically described. As illustrated in FIGS. 3 through 6, in the gas engine 1, the gas injectors 13 are attached to the intake manifold 3 fixed to a side surface of the cylinder head 2. In this gas engine 1, a fuel gas injected from the gas injectors 13 is premixed in the intake manifold 3, supplied to the plurality of cylinders, and ignited by the ignition devices 12.

Each of the ignition devices 12 includes, at its upper end, a connector 22 electrically connected to a harness (not shown), and includes, at its lower end, an ignition unit 30 using a center electrode and a ground electrode. The ignition devices 12 are inserted from the upper surface of the cylinder head 2 such that the ignition devices 12 are located in combustion chambers of the cylinders below the cylinder head 2 of the ignition unit 30 at the lower end. The plurality of ignition devices 12 (four ignition devices 12 in this embodiment) are arranged in the front-rear direction on the upper surface of the cylinder head 2.

The lower sides of the connectors 22 are held by ignition device fixing brackets 23 so that the ignition devices 12 are coupled to the head cover 15 through the ignition device fixing brackets 23. Each of the ignition device fixing brackets 23 has a plate shape elongated in the front-rear direction, and includes a fixing portion 24 having a bolt hole in its right edge and a holding portion 25 that is cut out at its left edge. The ignition devices 12 are fitted in the holding portions 25, and the connectors 22 of the ignition devices 12 are bolted to the ignition device fixing brackets 23 so that the ignition devices 12 are fixed to the ignition device fixing brackets 23. The fixing portions 24 of the ignition device fixing brackets 23 are bolted to the head cover 15 so that the ignition devices 12 whose lower ends are inserted in the cylinder head 2 are fixed onto the cylinder head with the ignition device fixing brackets 23 and the head cover 15 interposed therebetween.

The plurality of gas injectors 13 are individually fixed to the plurality of intake branch pipes 31 disposed in the intake manifold 3 with gas injecting ports 26 inserted in the intake branch pipes 31. The gas injectors 13 are fixed to the intake branch pipes 31 arranged in the front-rear direction to be arranged in the front-rear direction on the intake manifold 3, and to be coupled to the fuel gas supply rail 14 extending in the front-rear direction on the intake manifold 3. The gas injectors 13 includes, on its left side surface, a connector 29 electrically connected to a harness (not shown).

On a lower edge of the fuel gas supply rail 14, a plurality of gas discharge ports 27 are arranged in the front-rear direction, and the gas injectors 13 are individually coupled to the gas discharge ports 27. A gas inlet 28 that bends upward is provided at the rear end of the fuel gas supply rail 14. Accordingly, a fuel gas that has flowed into the fuel gas supply rail 14 through the gas inlet 28 at the rear end flows forward in the fuel gas supply rail 14, and thus, the fuel gas is supplied to the plurality of gas injectors 13 through the gas discharge ports 27 serving as a plurality of branch pipes.

The fuel gas supply rail 14 is fixed to a pair of front and rear coupling seats 37 disposed in the intake manifold 3, and is fixed to the cylinder head 2 through the intake manifold 3. That is, the fuel gas supply rail 14 is fastened, with the bolts 21, to each of the front coupling seat 37 disposed at the rear of the foremost intake branch pipe 31 and the rear coupling seat 37 disposed in front of the rearmost intake branch pipe 31.

Next, with reference to FIGS. 5 through 8, the intake manifold 3 will be described in detail. As illustrated in FIGS. 5 through 8, the intake manifold 3 has a configuration in which the plurality of intake branch pipes 31 communicating with the cylinders (not shown) are branched from an intake collecting pipe 32 at an air supply side. The intake manifold 3 is constituted by coupling a manifold upper part 33 and a manifold lower part 34. The manifold upper part 33 constitutes an upper portion of the intake collecting pipe 32 and the intake branch pipes 31. The manifold lower part 34 constitutes a lower portion of the intake collecting pipe 32.

In the intake manifold 3, the plurality of intake branch pipes 31 are arranged in the front-rear direction. The intake manifold 3 includes an intake air taking portion 35 located at the center of the intake collecting pipe 32 in the front-rear direction and projecting in a direction away from the cylinder head 2. That is, a center portion of the intake collecting pipe 32 in the front-rear direction includes the intake air taking portion 35 projecting to the left, and the upper surface of the intake air taking portion 35 has an opening where an intake air inlet 36 is formed. The intake air throttle valve 11 is mounted on and fixed to the upper surface of the intake air taking portion 35, and an air discharge side of the intake air throttle valve 11 communicates with the intake air inlet 36.

With this configuration, air that has flowed from the intake air throttle valve 11 into the intake air taking portion 35 is divided and flows forward and rearward in the intake collecting pipe 32. Thus, air uniformly flows in the intake branch pipes 31 arranged in the front-rear direction. Accordingly, air having the same volume and flow rate flows in the plurality of intake branch pipes 31 so that a fuel gas injected into the intake branch pipes 31 from the gas injectors 13 can be uniformly mixed with air. A difference in combustion level among the cylinders in the cylinder block 5 can be reduced so that an engine output shaft can be smoothly rotated and driven.

The intake air taking portion 35 includes, in its front surface, a blow-by gas inlet 47 to which a blow-by gas return pipe 17 is connected. Accordingly, when a blow-by gas flows into the intake air taking portion 35 through the blow-by gas return pipe 17, the blow-by gas is mixed with air supplied from the intake air throttle valve 11 in the intake air taking portion 35. Then, an air-fuel mixture of the blow-by gas and air is supplied from the intake air taking portion 35 to the intake collecting pipe 32.

An air-fuel mixture discharge side of each of the plurality of intake branch pipes 31 is provided with coupling flanges 38 coupled to and fixed to the left side surface of the cylinder head 2 with bolts 39, and the coupling flanges 38 couple the intake branch pipes 31 adjacent to each other in the front-rear direction. The intake manifold 3 includes the pair of front and rear coupling seats 37 located around the foremost and rearmost intake branch pipes 31 extending from the front and rear ends of the intake collecting pipe 32. The fuel gas supply rail 14 for supplying a fuel gas to the plurality of gas injectors 13 is fixed to the pair of front and rear coupling seats 37 to thereby extend in the front-rear direction above the intake manifold 3.

That is, the fuel gas supply rail 14 is fixed to the coupling seats 37 disposed on portion of the intake manifold 3 fixed to the cylinder head 2 near the coupling flanges 38, while being fastened with the bolts 21. Accordingly, the plurality of gas injectors 13 and the fuel gas supply rail 14 can be formed as one unit with the intake manifold 3, and thus, ease of assembly to the cylinder head 2 can be enhanced. In addition, since the fuel gas supply rail 14 is fixed to a coupling portion between the cylinder head 2 and the intake manifold 3, the fuel gas supply rail 14 can be fixed with high rigidity.

The intake branch pipes 31 include bent portions 40, and air that has flowed from the intake air taking portion 35 into the intake collecting pipe 32 is guided toward an intake port 46 of the cylinder head 2 through the intake branch pipes 31. In each of the bent portions 40 of the intake branch pipes 31, an outside inner wall 41 opposite to (outer side of) the cylinder head 2 has a smooth bent surface, whereas an inside inner wall 42 toward the cylinder head 2 (inner side) is bent at an acute angle. An acute bent point (corner) 45 is provided on the inner side (inside inner wall 42) of each of the bent portions 40 of the intake manifold 3 causes a turbulent flow to be formed in a downstream portion of the bent point 45 (upper surface portion 44 of the inside inner wall 42) so that a fuel gas injected from the gas injectors 13 is easily mixed with air.

That is, while air that has flowed from the intake collecting pipe 32 into the intake branch pipes 31 flows along each of the inside inner wall 42 and the outside inner wall 41, the air is suddenly bent on the bent points 45 where an air flow is at an acute angle, and thus, separation occurs in the upper surface portion 44 of the inside inner wall 42. Accordingly, air vortexes occur in the bent portions 40 of the intake branch pipes 31, and a fuel gas is mixed in air by the influence of turbulent flows caused by the air vortexes, and mixing of a fuel gas in air is promoted. Thus, degradation of emission can be suppressed.

The cylinder head 2 is fixed to the upper surface of the cylinder block 5, and the intake collecting pipe 32 of the intake manifold 3 is disposed at a side of the cylinder block 5. The intake branch pipes 31 extend upward from the intake collecting pipe 32 and include the bent portions 40 at a side of the cylinder head 2, and the gas injecting ports 26 of the gas injectors 13 are inserted in the bent portions 40. The cylinder head 2 includes gas injector fixing seats 43 in the bent portions 40, and the gas injecting ports 26 of the gas injectors 13 are inserted in through holes of the gas injector fixing seats 43. Accordingly, a fuel gas is injected toward vortex flows of air generated in the bent portions 40 in the intake manifold 3 from the gas injecting ports 26 of the gas injectors 13, and the fuel gas is easily mixed in air. Thus, in an air-fuel mixture to be supplied to the intake port 46 of the cylinder head 2, nonuniformily in a fuel gas concentration decreases. As a result, abnormal combustion in the cylinders can be suppressed.

In the intake manifold 3, a gas injection direction in which a fuel gas is injected from gas injecting ports 26 of the gas injectors 13 is a direction toward a location on the upper surface portion 44 of the inside inner wall 42 in the bent portions 40 and closer to the cylinder head 2 than the bent point 45. That is, an attachment angle of the gas injectors 13 is disposed downstream of (closer to the cylinder head 2 than) the bent point (corner) 4, and a fuel gas is injected from the gas injectors toward turbulent flows formed downstream of the upper surface portion 44 of the inside inner wall 42. Thus, mixing of the air-fuel mixture can be enhanced.

The intake manifold 3 includes a sensing portion 49 that is disposed in a rear portion of the intake collecting pipe 32 and projects in the direction opposite to the direction toward the cylinder head 2. That is, a rear portion of the intake collecting pipe 32 includes the sensing portion 49 projecting to the left, and is provided with a sensor 49A for measuring an intake air pressure and an intake air temperature in the intake manifold 3.

The intake manifold 3 is formed by aluminium die casting, and an intake air channel 50 that is bent in the intake manifold 3 is formed by lateral hole cores 51 and a vertical hole core 52. More specifically, each of the manifold upper part 33 and the manifold lower part 34 of the intake manifold 3 is formed by aluminium die casting. Then the obtained manifold upper part 33 and manifold lower part 34 are coupled to each other in the top-bottom direction with bolts 58, thereby constituting the intake manifold 3.

The plurality of lateral hole cores 51 are provided for each of the intake branch pipes 31, and the vertical hole core 52 has a shape branched from a portion above the intake collecting pipe 332 toward the intake branch pipes 31. A right end surface 53 of each of the lateral hole cores 51 is constituted by a slope whose upper portion projects to the right. The upper end of the vertical hole core 52 is pointed upward in cross section. A left surface 54 of an upper end of the vertical hole core 52 is a slope in a direction along the right end surfaces 53 of the lateral hole cores 51. A right surface 55 of an upper end of the vertical hole core 52 is a smooth vent surface along the bent surfaces of the outside inner walls 41 of the bent portions 40. In forming the manifold upper part 33, the right end surfaces 53 of the lateral hole cores 51 and the left surface 54 of the upper end of the vertical hole core 52 are in close contact with each other so that lower surfaces 56 of the lateral hole cores 51 and the left surface 57 of an intermediate portion of the vertical hole core 52 form the inside inner walls 42 of the bent portions 40. At this time, the bent points 45 of the bent portions 40 are formed in contact portions between the lower ends of the right end surfaces 53 of the lateral hole cores 51 and the left end of the left surface 54 of the upper end of the vertical hole core 52.

In forming by aluminium die casting, to form the intake air channel 50 in the intake branch pipes 31, the manifold upper part 33 is in a state where the lateral hole cores 51 and the vertical hole core 52 are inserted in the manifold upper part 33. In the manifold upper part 33 thus formed, the lateral hole cores 51 are taken out from an air discharge side communicating with the intake port 46 of the cylinder head 2, whereas the vertical hole core 52 is taken out from the intake collecting pipe 31. At this time, since the manifold upper part 33 is formed by aluminium die casting, a portion of the inside inner wall 42 having the acute bent point 45 can be fabricated with stability at the contact surface between the lateral hole cores 51 and the vertical hole core 52.

Second Embodiment

Figure 9:
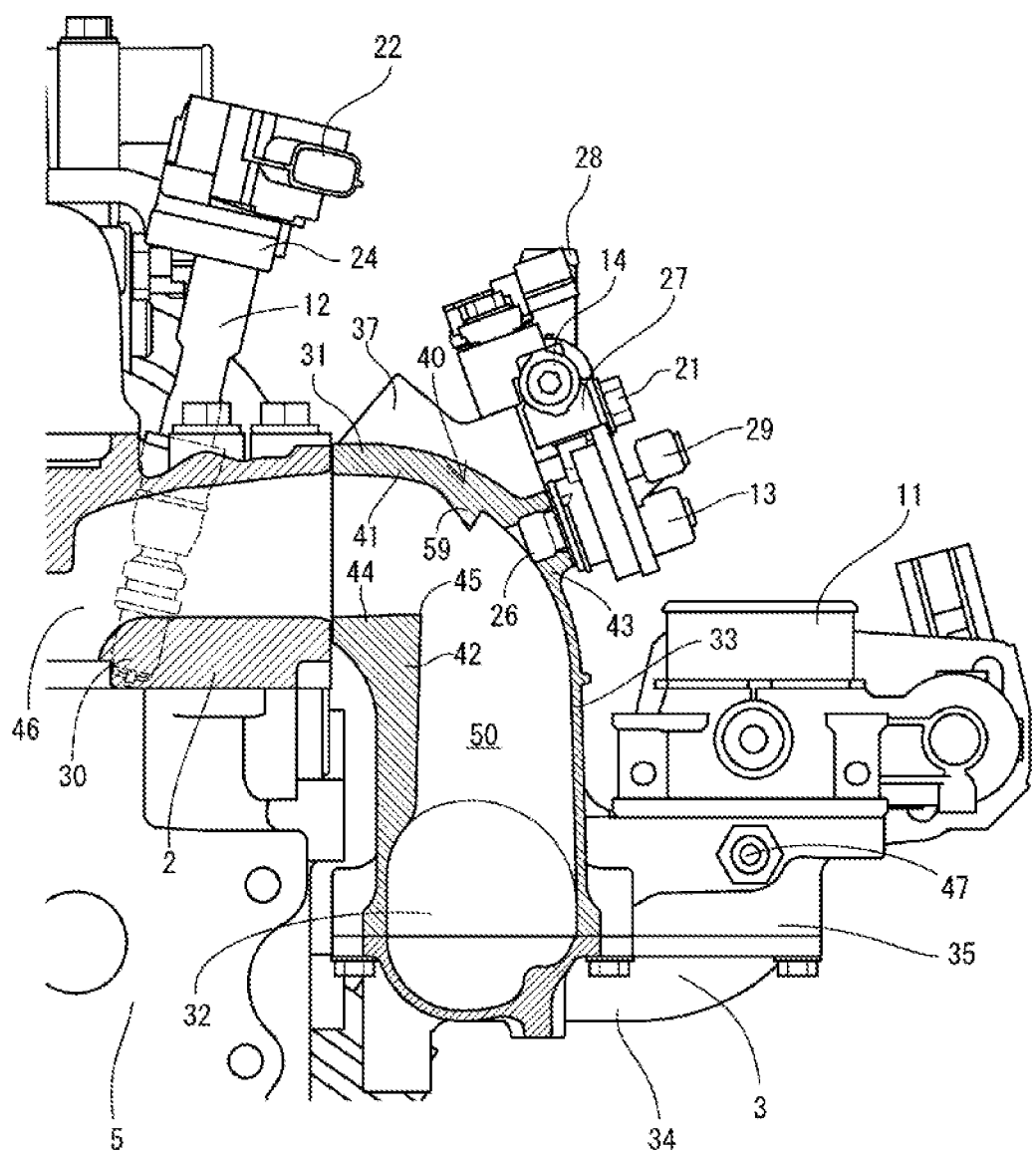
FIG. 9 A cross-sectional view of an intake manifold and a cylinder head of a gas engine according to a second embodiment of the present invention.
Figure 10:
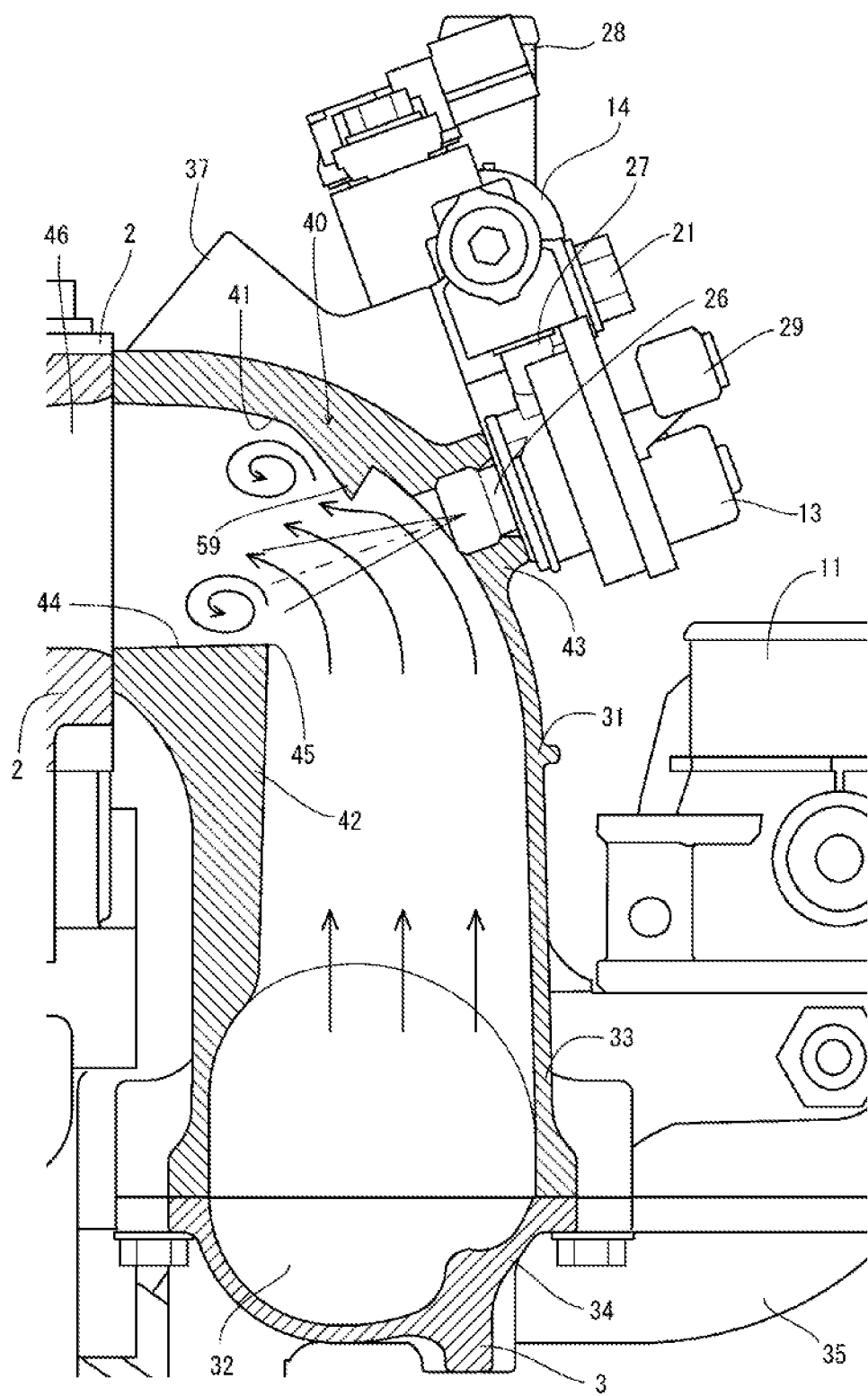
FIG. 10 An enlarged cross-sectional view of FIG. 9.
Figure 11:
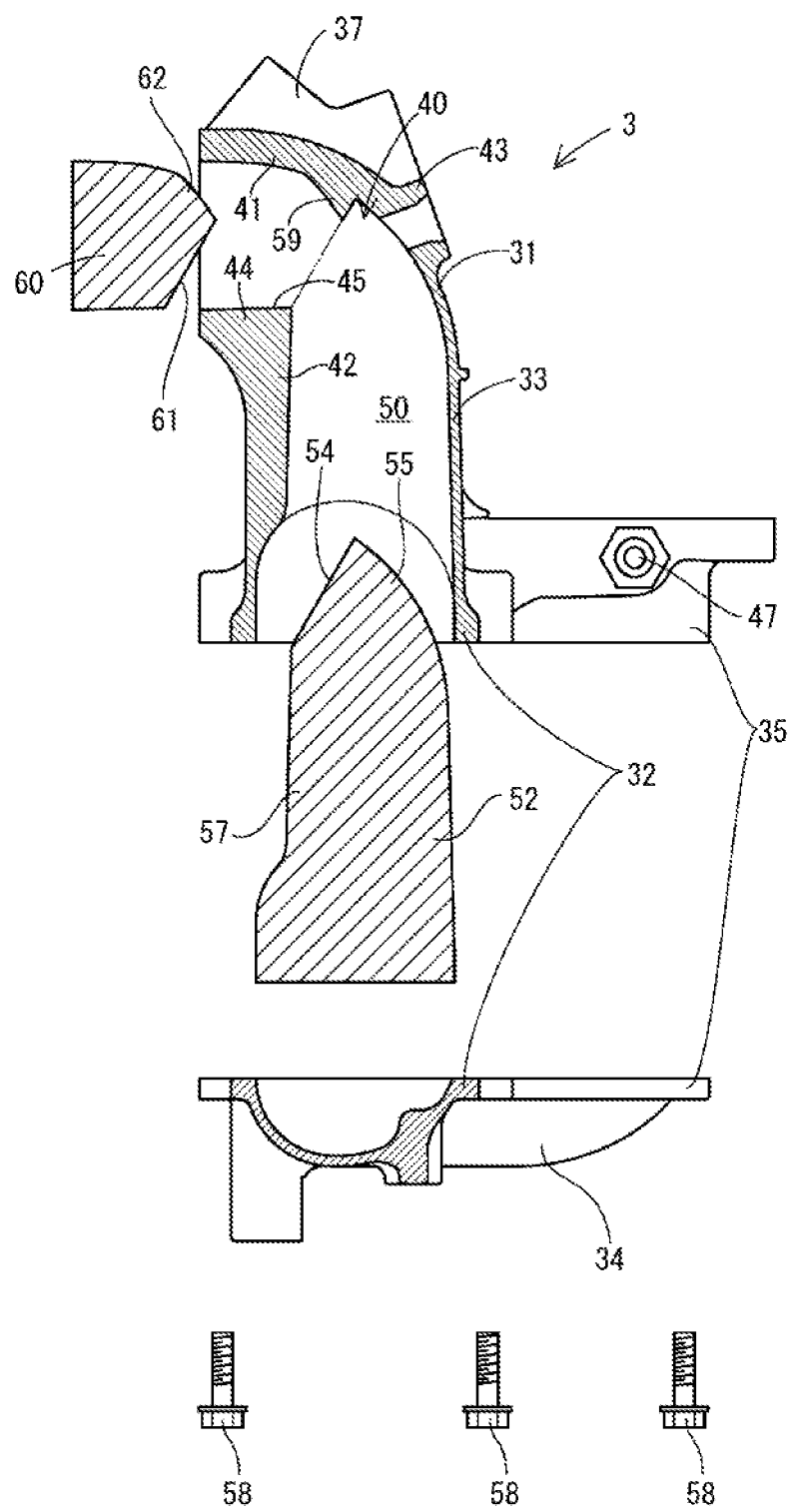
FIG. 11 A disassembled cross-sectional view illustrating a configuration of the intake manifold of the gas engine.
Figure 12:
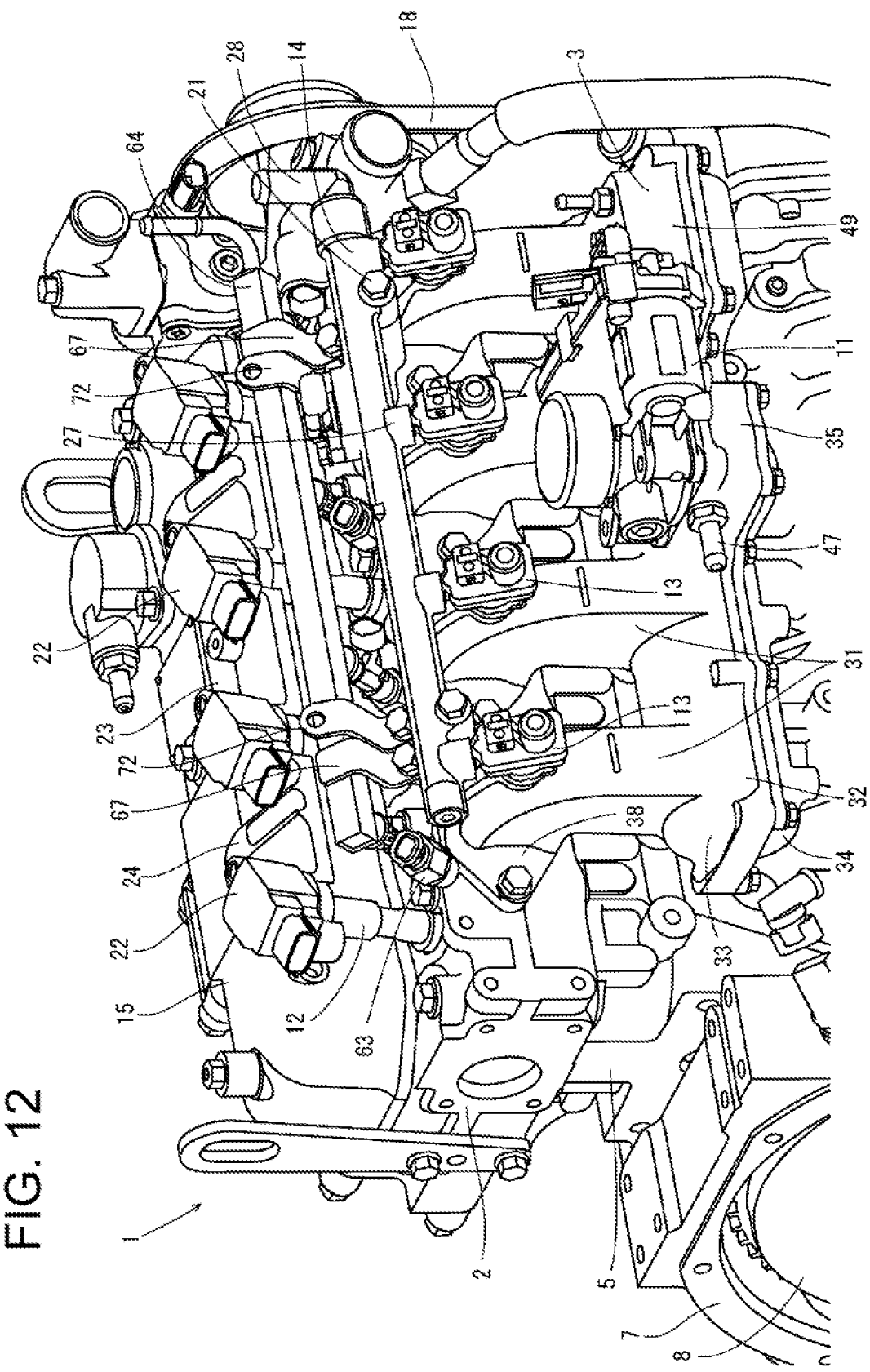
FIG. 12 An enlarged perspective view of a Bi-Fuel engine according to a third embodiment of the present invention.
Figure 13:
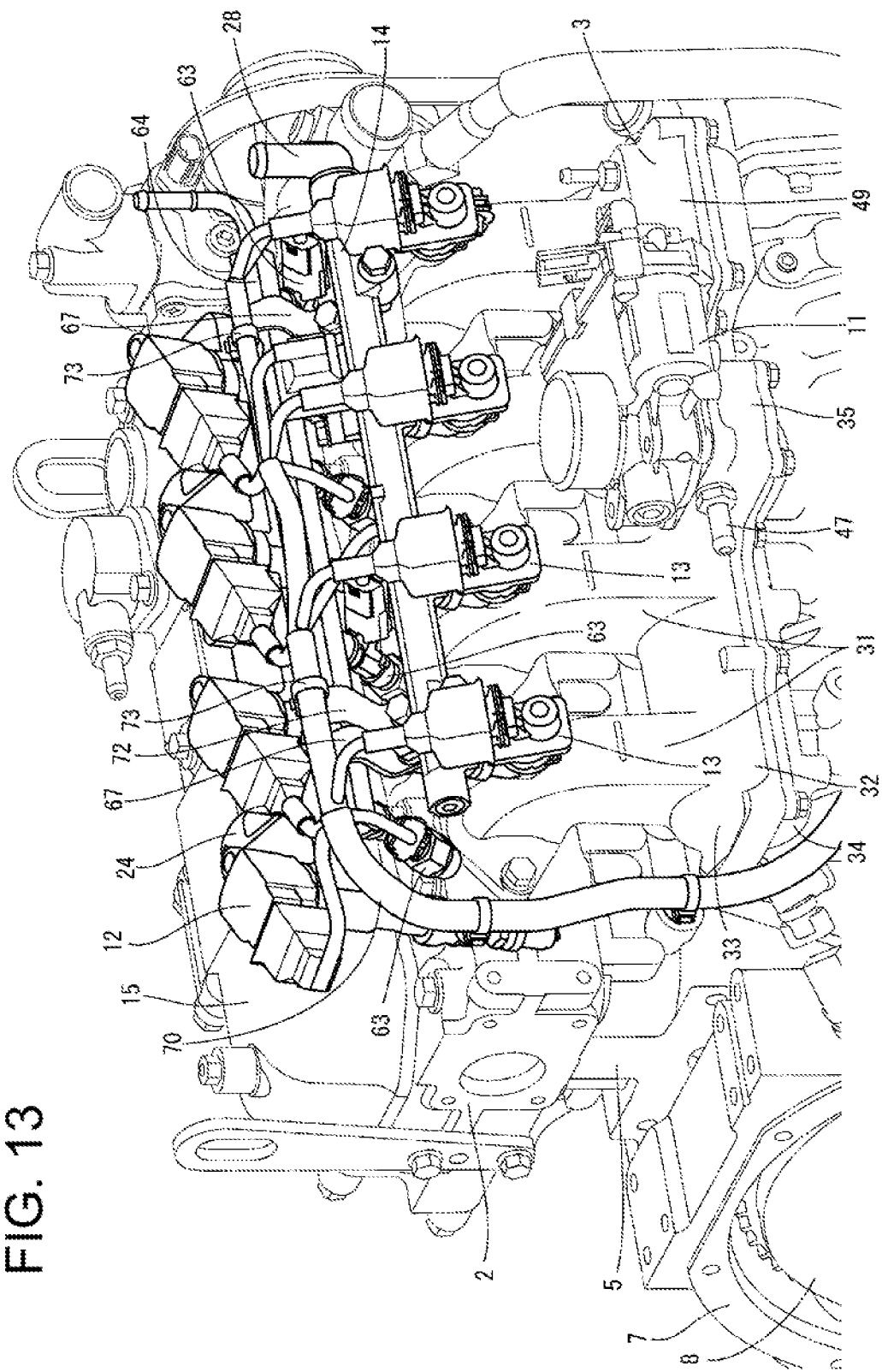
FIG. 13 A perspective view illustrating a relationship among an ignition device, a gas injector, and a gasoline injector of the Bi-Fuel engine.
Figure 14:
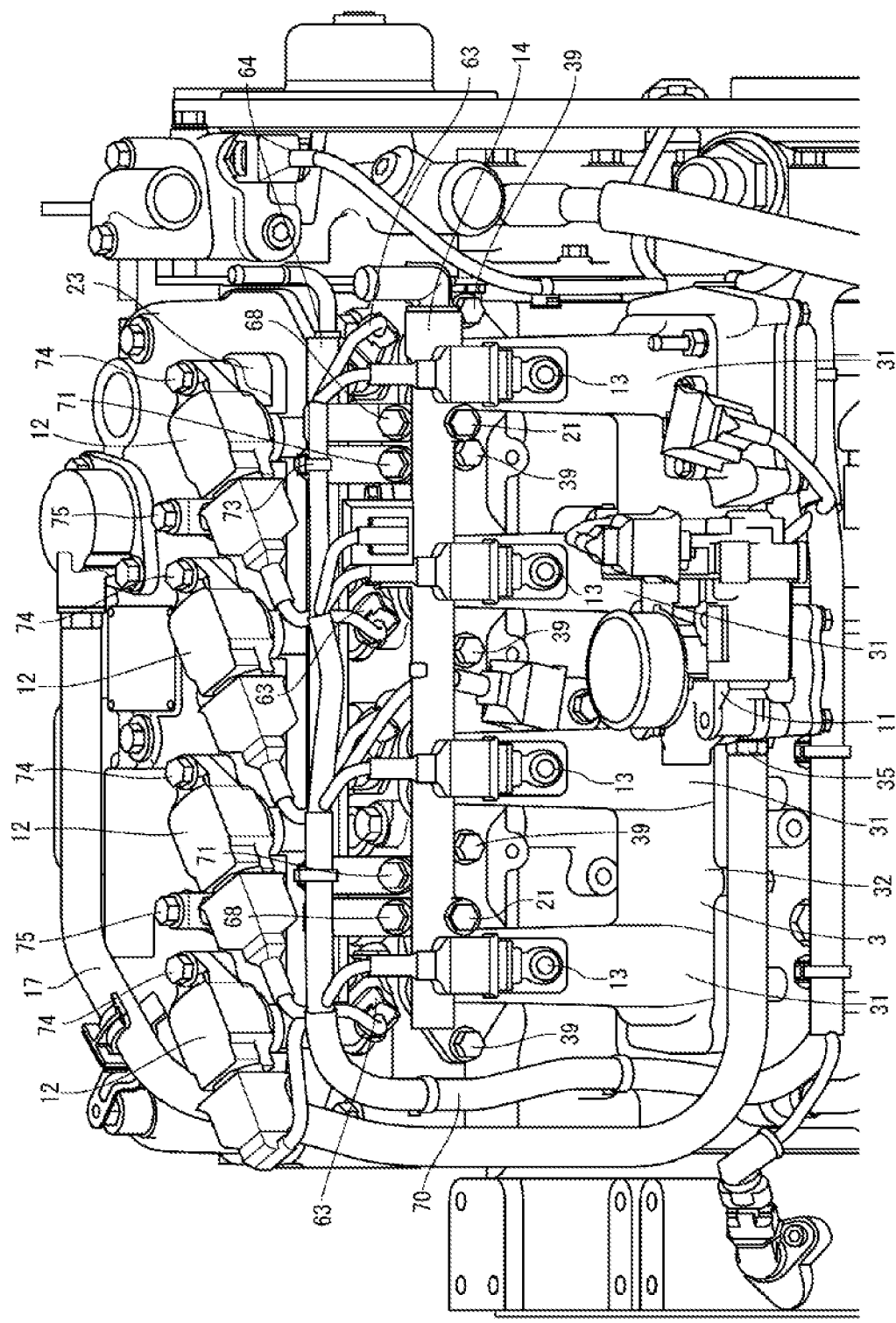
FIG. 14 A perspective view of the Bi-Fuel engine when seen from left above.
Figure 15:
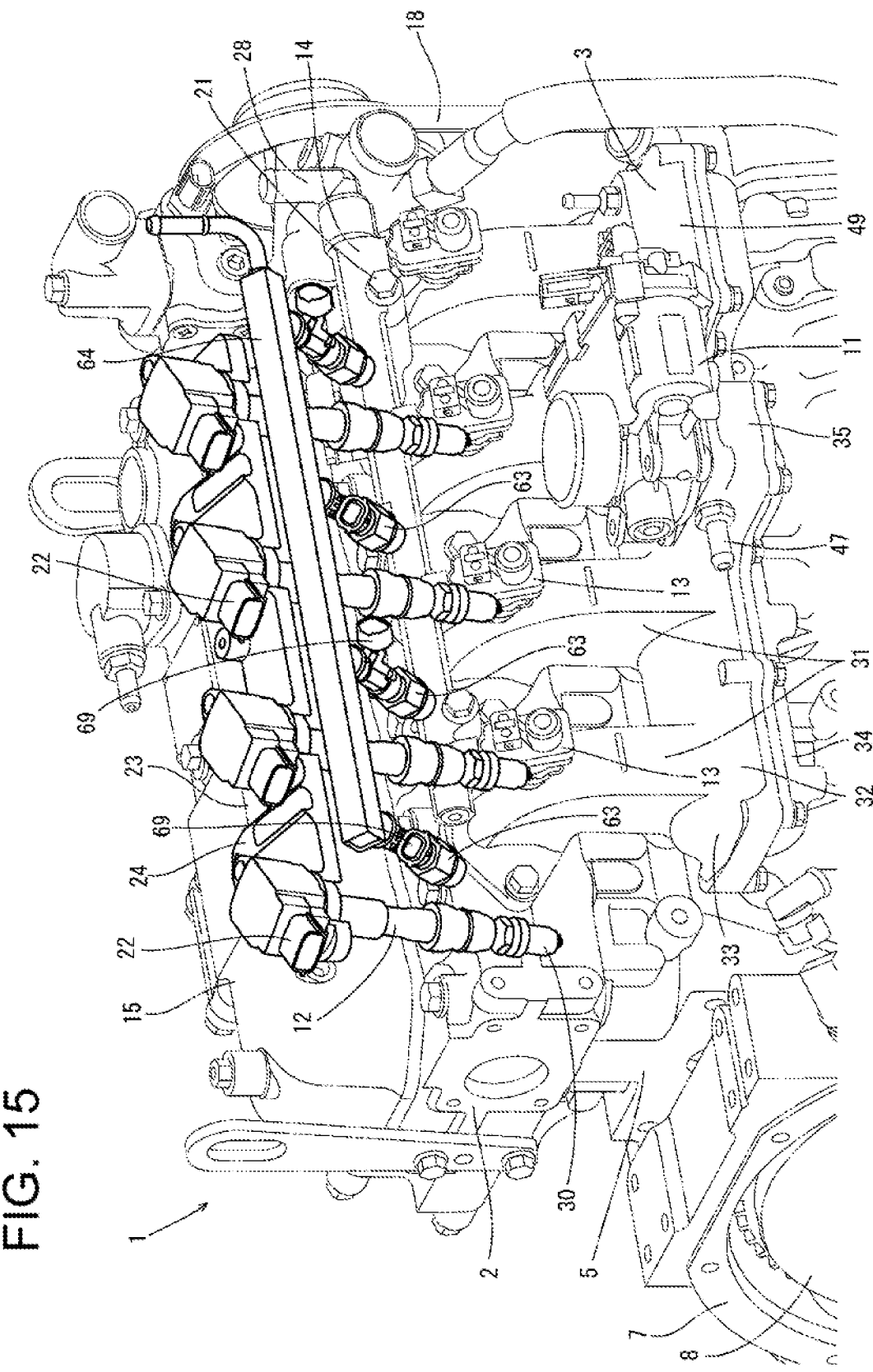
FIG. 15 A perspective view illustrating a relationship between the ignition device and the gasoline injector of the Bi-Fuel engine.
Figure 16:
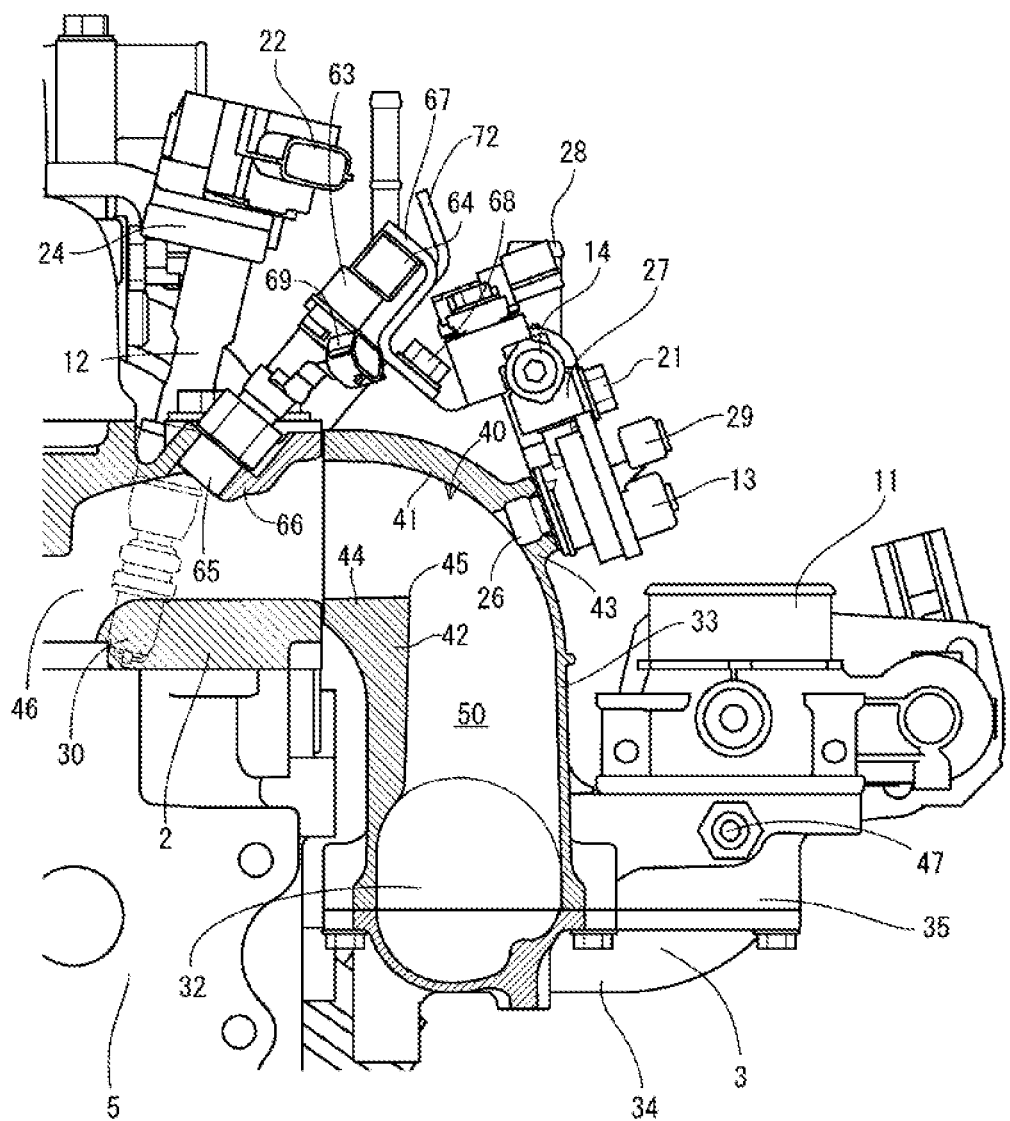
FIG. 16 A cross-sectional view of an intake manifold and a cylinder head of the Bi-Fuel engine.

A gas engine 1 according to a second embodiment of the present invention will be described with reference to FIGS. 9 through 11. As illustrated in FIGS. 9 through 11, in the gas engine 1 of this embodiment, projections 59 projecting toward inside inner walls 42 are provided on portions of outside inner walls 41 of bent portions 40 of intake branch pipes 31 closer to a cylinder head 2 than gas injecting ports 26 of gas injectors 13 in an intake manifold 3. That is, in an intake air channel 50 in the intake manifold 3, the projections 59 for generating turbulent flows are provided on the outside inner walls 41 downstream of gas injectors 13 (near the cylinder head 2).

In the bent portions 40 of the intake branch pipes 31, the intake manifold 3 includes the outside inner walls 41 having the projections 59 and the inside inner walls 42 having the acute bent points 45. On the outside inner walls 41, gas injector fixing seats 43 are provided outside (upstream of) the projections 59. The gas injectors 13 are fixed to the bent portions 40 of the intake branch pipes 31 such that gas injecting ports 26 of the gas injectors 13 inserted in gas injector fixing seats 43 face upper surface portions 44 of the inside inner walls 42.

With this configuration, air flowing in the intake air channel 50 of the intake branch pipes 31 is subjected to separation by the inside inner walls 42 and the projections 59 at a downstream side of the gas injecting ports 26 of the gas injectors 13, and vortex turbulent flows are generated on upper surface portions of the inside inner walls 42 and downstream of the projections 59. Thus, gaseous fuel from the gas injectors 13 is injected toward air turbulent flows generated in the bent portions 40 of the intake branch pipes 31, and thus, the gaseous fuel and air are efficiently mixed. Consequently, emission can be reduced.

In forming the intake manifold 3 by aluminium die casting, an intake air channel 50 in a manifold upper part 33 is formed by lateral hole cores 60 and a vertical hole core 52. A right end of each of the lateral hole cores 60 is pointed to the right in a cross section, and is constituted by a lower slope 61 and an upper slope 62. The lower slope 61 at the right end of the lateral hole core 60 is a slope in a direction along a left surface 54 of an upper end of the vertical hole core 52, and a lower slope 61 of the right end of each of the lateral hole cores 60 and the left surface 54 of the upper end of the vertical hole core 52 are in close contact with each other. The upper slope 62 of the right end of the lateral hole core 60 is configured such that the upper slope 62 is separated away from the left surface 54 of the upper end of the vertical hole core 52 as the distance to the outside inner wall 41 decreases. Accordingly, the projection 59 on the outside inner wall 41 is formed between the upper slope 62 of the right end of the lateral hole core 60 and the left end 54 of the upper end of the vertical hole core 52.

Third Embodiment

A Bi-Fuel engine 1A according to a third embodiment of the present invention will be described specifically with reference to FIGS. 12 through 16. As illustrated in FIGS. 12 through 16, as compared to the gas engine 1 of the first embodiment, the Bi-Fuel engine 1A according to this embodiment includes a plurality of gasoline injectors 63 that spray gasoline toward intake ports 46 of cylinders of in a cylinder head 2, and a gasoline supply rail 64 for supplying gasoline to the gasoline injectors 63. That is, the Bi-Fuel engine 1A is driven by selecting one of a gas mode in which an air-fuel mixture is generated by injecting a fuel gas from the gas injectors 13 into the intake manifold 3 and is ignited by ignition devices 12 and a gasoline mode in which an air-fuel mixture is generated by spraying gasoline from the gasoline injectors 63 to the intake ports 46 and is ignited by the ignition devices 12.

The gasoline injectors 63 are disposed on the cylinder head 2, and fuel injection ports 65 of the gasoline injectors 63 are inserted in the intake ports 46 in the cylinder head 2. Portions of the cylinder head 2 in which the fuel injection ports 65 are inserted project inward of the intake ports 46. That is, in a left side portion of the upper surface of the cylinder head 2, a plurality of gasoline injector fixing seats 66 are arranged in the front-rear direction, and the fuel injection ports 65 of the gasoline injectors 63 are inserted in through holes to the intake ports 46 provided in the gasoline injector fixing seats 66. Then, portions of the gasoline injectors 63 in which the fuel injection ports 65 are inserted protrude toward the intake ports 46 in the cylinder head 2.

Since the cylinder head 2 includes the gasoline injector fixing seats 66, portions of the gasoline injectors 63 in which the fuel injection ports 65 are inserted are located downstream of the gas injectors 13. These insertion portions of the fuel injection ports 65 have shape protruding toward the intake ports 46. Thus when a fuel gas is injected by the gas injectors 13 in the gas mode, turbulent flows are generated in an air-fuel mixture of air and a fuel gas supplied from the intake manifold 3 so that mixing of air and a fuel gas is promoted, and occurrence of emission can be suppressed.

The gasoline supply rail 64 extends in the front-rear direction so as to communicate with the upper ends of the plurality of gasoline injectors 63. That is, the gasoline supply rail 64 is disposed on the intake manifold 3 so as to be fixed to the intake manifold 3 through a rail fixing bracket 67 and extend in parallel with the fuel gas supply rail 14. One end of the rail fixing bracket 67 is welded to the gasoline supply rail 64, and the other end of the rail fixing bracket 67 is fastened to the coupling seats 37 of the intake manifold 3 with bolts 68.

Intermediate portions of the gasoline injectors 63 projecting from the cylinder head 2 include connectors 69 electrically connected to a harness 70 described later. The connector 69 of the foremost gasoline injector 63 is oriented obliquely leftward and forward, and the connector 69 of the rearmost gasoline injectors 63 is oriented obliquely rearward and leftward. The gasoline injectors 63 are disposed such that the connectors 69 of ones of gasoline injectors 63 adjacent to each other in the front-rear direction are oriented in opposite directions. Accordingly, connection to the harness 70 can be made easy.

One end of a harness fixing bracket 72 is fastened to the coupling seats 37 of the intake manifold 3 with bolts 71, and the harness 70 is fixed to the other end of the harness fixing bracket 72 with a harness clip 73. The upper end (other end) of the harness fixing bracket 72 extends above the upper end of the rail fixing bracket 67. The harness 70 is disposed above the gasoline supply rail 64 in parallel with the fuel gas supply rail 14 and the gasoline supply rail 64. Thus, the harness 70 can be easily connected to the ignition devices 12, the gas injectors 13, and the gasoline injectors 63 that are arranged in the front-rear direction.

The fuel gas supply rail 14, the ignition device fixing brackets 23, the gasoline supply rail 64, and the harness 70 are arranged in parallel so that appropriate gaps can be obtained among the ignition devices 12, the fuel gas supply rail 14, the gasoline supply rail 64, and the harness 70. Thus, when the Bi-Fuel engine 1A is seen from above and left, the bolts 39 for fixing the intake manifold 3, the bolts 21 for fixing the fuel gas supply rail 14, and bolts 68 for fixing the gasoline supply rail 64, bolts 71 for fixing the harness fixing bracket 72, the bolts 74 for fixing ignition devices 12, and the bolts 75 for fixing the ignition device fixing brackets 23. Thus, ease of assembly and maintainability of the Bi-Fuel engine 1A can be enhanced.

The present invention is not limited to the embodiments described above, but can be embodied into various aspects. The configurations of components in the present invention are not limited to those of the illustrated embodiments, and can be variously changed without departing from the gist of the present invention.

REFERENCE SIGNS LIST 1 gas engine
2 cylinder head
3 intake manifold
4 engine output shaft
5 cylinder block
6 exhaust manifold
7 flywheel housing
8 flywheel 9 oil pan
10 oil filter
11 intake air throttle valve
12 ignition device
13 gas injector
14 fuel gas supply rail
15 head cover
16 blow-by gas reduction device
17 blow-by gas return pipe
18 transmission belt
19 coolant pump
20 alternator
31 intake branch pipe
32 intake collecting pipe
33 manifold upper part
34 manifold lower part
35 intake air taking portion
36 intake air inlet
37 coupling seat
38 coupling flange
39 bolt
40 bent portion
41 outside inner wall
42 inside inner wall
43 gas injector fixing seat
44 upper surface portion
45 bent point

The invention claimed is:

1. An engine device including:
a cylinder head;
an intake manifold fixed to a side surface of the cylinder head; and
a gas injector attached to the intake manifold, the engine device being configured such that a fuel gas injected from the gas injector is premixed in the intake manifold, supplied into a plurality of cylinders, and ignited by an ignition device,
wherein:
the intake manifold has a configuration in which a plurality of intake branch pipes configured to communicate with the cylinder are branched from an intake collecting pipe at an air supply side, each of the intake branch pipes having a bent portion;
the bent portion of each of the intake branch pipes is defined at least in part by an inside inner wall and an outside inner wall, the outside inner wall interposed between the inside inner wall and an atmosphere; and
at least a portion of the inside inner wall defines an acute angle.

2. The engine device according to claim 1, wherein:
the cylinder head is fixed to an upper surface of a cylinder block; and
in the intake manifold, the intake collecting pipe is disposed at a side of the cylinder block, the intake branch pipes extend upward from the intake collecting pipe, and have the bent portion of each of the intake branch pipes at a side of the cylinder head, and a gas injecting port of the gas injector is inserted in the bent portion.

3. The engine device according to claim 2 wherein in the intake manifold, a gas injection direction in which a fuel gas is injected from a gas injecting port of the gas injector is a direction toward a location which is on an upper surface of an inside inner wall of the bent portion and is closer to the cylinder head than a bent point.

4. The engine device according to claim 2, wherein in the intake manifold, a projection projecting toward the inside inner wall is disposed on the outside inner wall of the bent portion at a location closer to the cylinder head than the gas injecting port.

5. The engine device according to claim 2, wherein:
a gasoline injector is disposed on the cylinder head;
a fuel injection port of the gasoline injector is inserted to an intake port in the cylinder head; and
a portion of the cylinder head in which the fuel injection port is inserted projects inward of the intake port.

6. The engine device according to claim 1, wherein the intake manifold is formed by aluminum die casting.

7. The engine device according to claim 1, wherein in the intake manifold, the plurality of the intake branch pipes are arranged in a front-rear direction of the intake manifold, and an intake air taking portion protruding in a direction opposite to a direction toward the cylinder head is provided at a center of the intake collecting pipe in the front-rear direction.

8. The engine device according to claim 7, wherein:
the intake manifold includes a pair of front and rear coupling seats near a foremost one and a rearmost one of the intake branch pipes extending from front and rear ends of the intake collecting pipe;
the gas injector includes a plurality of gas injectors; and
a fuel gas supply rail for supplying a fuel gas to each gas injector of the plurality of gas injectors is fixed to the pair of front and rear coupling seats so as to thereby extend in the front-rear direction above the intake manifold.

9. The engine device according to claim 1, wherein:
the inside inner wall includes a first surface and a second surface;
the first surface faces away from the cylinder head; and
the second surface is coupled to the first surface and faces away from the intake collecting pipe.

10. The engine device according to claim 9, wherein the first surface and the second surface define the acute angle.

11. The engine device according to claim 9, wherein the first surface and the second surface define a corner, the corner including the acute angle.

12. The engine device according to claim 1, further comprising a gasoline injector coupled to the cylinder head.

13. The engine device according to claim 1, wherein a fuel injection port of a gasoline injector is configured to be in fluid communication with the cylinder head via an intake port of the cylinder head.

14. The engine device according to claim 13, further comprising the gasoline injector disposed on the cylinder head.

15. The engine device according to claim 1, wherein the cylinder head is configured to define an intake port configured to receive a gasoline injector.

16. The engine device according to claim 15, wherein the intake port is configured to receive a fuel injection port of the gasoline injector.

17. The engine device according to claim 15, further comprising the gasoline injector, the gasoline injector including a fuel injection port.

18. The engine device according to claim 1, wherein an intake port of the cylinder head faces away from the side surface of the cylinder head, the intake port configured to receive a fuel injection port of a gasoline injector.

19. The engine device according to claim 18, wherein:
the cylinder head includes a second side; and the cylinder head is interposed between the second side and the side surface.

20. The engine device according to claim 19, wherein the intake port of the cylinder head faces towards the second side.

* * * * *